(12) United States Patent
Zauderer (10) Patent No.: US 7,047,748 B2
(45) Date of Patent: May 23, 2006

(54) INJECTION METHODS TO REDUCE NITROGEN OXIDES EMISSION FROM GAS TURBINES COMBUSTORS

(76) Inventor: Bert Zauderer, 275 N. Highland Ave., Merion Station, PA (US) 19066

( * ) Notice: Subject to any disclaimer, the term of this patent is extended or adjusted under 35 U.S.C. 154(b) by 189 days.

(21) Appl. No.: 10/717,602

(22) Filed: Nov. 21, 2003

(65) Prior Publication Data

US 2005/0000220 A1 Jan. 6, 2005

Related U.S. Application Data (60) Provisional application No. 60/433,609, filed on Dec. 16, 2002, provisional application No. 60/430,090, filed on Dec. 2, 2002.

(51) Int. Cl.
*F02C 3/30* (2006.01)

(52) U.S. Cl. ........................................ 60/775; 60/39.55

(58) Field of Classification Search .................. 60/775, 60/39.55

See application file for complete search history.

(56) References Cited

U.S. PATENT DOCUMENTS

| | | | | |
|---|---|---|---|---|
| 1,988,456 | A | * | 1/1935 | Lysholm ..................... 60/39.55 |
| 4,382,771 | A | * | 5/1983 | Carr .......................... 60/39.55 |
| 4,765,258 | A | | 8/1988 | Zauderer |
| 4,958,488 | A | * | 9/1990 | Wilkes et al. .............. 60/39.55 |
| 6,048,510 | A | * | 4/2000 | Zauderer .................... 423/235 |
| 6,112,511 | A | * | 9/2000 | Myers ....................... 60/39.55 |
| 6,453,830 | B1 | | 9/2002 | Zauderer |

OTHER PUBLICATIONS

NOx Emissions from Stationary Gas turbines, PEA-453/R-93-007, Jan. 1993.
A.H. Lefebvre, "Gas Turbine Combustion", (Hemisphere Publishing, Washington, DC, 1983) selected pages cited.
B.H. Jennings & W.L. Rogers, "Gas Turbine Analysis & Practice" (McGraw Hill, NY, 1953) selected pages cited.
H.E. Miller, "Development of the General Electric Quiet Combustor and Other Design Changes to Benefit Quality", GER 3551, Mar. 8, 1998.
M.M. Schorr, "Gas Turbine NOx Emissions Approaching Zero—Is It Worth the Price", GE Company Document GER 4172, Sep. 1999.

(Continued)

*Primary Examiner*—Ted Kim
(74) *Attorney, Agent, or Firm*—Greenblum & Bernstein, P.L.C.

(57) ABSTRACT

A process having three steps utilized individually or in combination to reduce nitrogen oxides, $NO_x$, emissions from gas turbines. One or more injectors disperse very fine fuel droplets to achieve rapid and complete combustion in zone one immediately downstream of the fuel injectors. The second step uses one or more injectors inserted into the combustor to disperse water droplets throughout zone two, immediately downstream of zone one, to lower the gas temperature and suppress formation of thermal $NO_x$. The third step uses one or more injectors to disperse aqueous droplets containing a dissolved $NO_x$ reducing agent throughout zone three, immediately downstream of zone two, and whose gas temperature favors the reduction of $NO_x$. Alternatively, the dissolved $NO_x$ reducing agent can be mixed with a liquid fuel to convert zone three into slightly fuel rich conditions, enabling nitrogen oxide reduction at higher gas temperatures.

21 Claims, 3 Drawing Sheets

OTHER PUBLICATIONS

Mechanisms Governing the Destruction of Nitrogenous Species During The Fuel Rich Combustion of Pulverized Coal; J.W. Glass and J.O.L. Wendt, Nineteenth Symposium (International) on Combustion Institute, 1982, pp. 1243-1250.

Rate Controlling Reactions in Fixed Nitrogen Conversion to $N_2$; Yih H. Song and William Bartok, Nineteenth Symposium (International) on Combustion Institute, 1982, pp. 1291-1298.

* cited by examiner

INJECTION METHODS TO REDUCE NITROGEN OXIDES EMISSION FROM GAS TURBINES COMBUSTORS

CROSS REFERENCE TO RELATED APPLICATIONS

This application claims priority to U.S. provisional application Ser. No. 60/433,609, filed on Dec. 16, 2002, and U.S. provisional application No. 60/430,090, filed on Dec. 2, 2002, all of which are incorporated herein by reference in their entirety.

BACKGROUND OF THE INVENTION

1. Field of the Invention

This invention discloses methods whereby the emissions of nitrogen oxides, $NO_x$, from existing combustion gas turbines that have little or no $NO_x$ reduction controls can be reduced.

2. Description of Prior Art

Electricity demand varies hourly, daily and seasonally with peak demand occurring during mid-day, during the summer air conditioning season. Simple cycle gas turbines are especially suited to meet this peaking demand due to their relative simplicity and rapid startup capability, and they have been used for decades for this purpose. However, increasingly stringent limitations on the emission of nitrogen oxides from older gas turbines with little or no nitrogen oxides, $NO_x$, emission controls have resulted in their retirement or limited their use to power production emergencies with annual operating limits ranging from several 10's of hours to several 100's of hours. However, in times of extended power shortages, such as has occurred in California in 2000 and 2001, government authorities have allowed these turbines to be placed into service for as much as several 1000 hours annually, provided the high $NO_x$ emissions are offset with lower emissions from other $NO_x$ producing industrial machinery, or by payment of an extremely high $NO_x$ emission fee. While this waiver makes it economical to operate gas turbines with some $NO_x$ control, it is prohibitively expensive to operate turbines having no $NO_x$ control. For example, according to $NO_x$ emission data published by the Environmental Protection Agency (EPA) under the Acid Rain Emission Program, oil fired, simple cycle, peaking turbines in the 10 to 100 megawatt output range with no $NO_x$ controls emit about 0.4 to 0.5 lb/MMBtu. Similar size turbines without $NO_x$ controls fired with natural gas emit between 0.3 to 0.45 lb/MMBtu (equal to 200 to 330 part per million (ppm) at 3% $O_2$.

There is, therefore, a need for a simple, low cost method or methods that allows the addition of $NO_x$ reduction equipment to these turbines and extend their use in peaking power applications.

As described by Lefebvre (Arthur H. Lefebvre, "Gas Turbine Combustion", [McGraw-Hill Company, New York, 1983]), in prior art, water droplets or steam has been injected into the combustion chamber of a gas turbine, fired either with natural gas or liquid petroleum fuels, to increase the power output, and to reduce the combustion gas temperature, thereby suppressing the formation of thermal $NO_x$. However, lowering the combustion temperature increased the formation of carbon monoxide, CO. For example, $NO_x$ reductions of over 90% have been achieved with a factor of about ten increases in CO, which replaces one pollutant, $NO_x$, with another, CO, (Lefebvre, FIG. 11.18, Page 483.) In the case of heavy residual fuels, which have substantial fuel bound nitrogen, water injection is to some extent counterproductive because the $NO_x$ yield from fuel bound nitrogen increases.

A very key curve (Lefebvre, FIG. 11.22, p.487) shows the importance of controlling the primary combustion zone for a hypothetical combustor meeting the 1977 automotive $NO_x$ emission standard. For optimum $NO_x$ reduction, the gas temperature must be within a very narrow range between 1600° K, below which CO increases rapidly above 70 ppm, and 1730° K, above which $NO_x$ increases rapidly above 5 ppm. This shows the importance of selecting the proper water injection location for controlling $NO_x$. In a handbook published in 1976 by the South Coast Air Quality Management District, Los Angeles area, Calif., $NO_x$ reductions to 30 ppm at 3% $O_2$ with water injection are reported for a 32 MW electric output Pratt & Whitney (P&W) peaking turbine. The $NO_x$ emission was 330 ppm at 3% $O_2$ for a 17 MW P&W turbine without injection. No CO data was given.

Lefebvre shows (FIG. 1120, p.485) that injecting the water with the combustion air is much less effective in reducing $NO_x$ compared to injecting directly into the primary combustion zone. A 75% reduction was obtained in a military aircraft (Reference 44, page 511) at a water/fuel ratio of unity in the latter case versus about 40% reduction in the former case.

Statler (U.S. Pat. No. 5,784,875, Jul. 28, 1998) offers a recent example, including prior patents, of the typical prior art by which water droplet injection was practiced to reduce $NO_x$ and increase power output. The common element in this prior art is that injection takes place in, or near, the fuel injection location. For example, for dual liquid fuel, natural gas fired combustors, the water droplets are injected in the natural gas fuel passages when fuel oil is the only fuel. If natural gas is the fuel, then separate water injection tubes located near the gas fuel injectors are used. Since water droplets lower the gas temperature, this increases unburned hydrocarbons and CO formation, Steam injection, instead of water, has also been used to reduce $NO_x$ in prior art, (H. E. Miller, "Development of the General Electric Quiet Combustor", GER 3551, Mar, 8, 1988). In the GE F7001 gas turbine, 25 ppmv (at 15% $O_2$) $NO_x$ emissions with natural gas and 55 ppmv (at 15% $O_2$) with fuel oil, were achieved. However, steam may be unsuitable for simple cycle, peaking turbines, which may not have access to high-pressure steam from a boiler. Also, it has the same deficiency as water injection near the fuel inlet in that unburned hydrocarbons and carbon monoxide will increase. In addition, it is more difficult to assure uniform mixing of the steam and combustion gas to yield uniform gas temperature reduction and reduce $NO_x$.

Staged combustion is another $NO_x$ reducing method, in which part of the combustion takes place in a pre-combustor chamber at fuel rich conditions, which occurs at a lower gas temperature and inhibits $NO_x$ formation. The resultant gases flow into the main combustion chamber where they mix with the bulk of the air for final combustion (Lefebvre, pages 491–497). Miller (GER3551) cites a combustor design using this staged combustion method that also achieved 25 ppmv $NO_x$ emissions at 15% $O_2$. Apparently this latter method cannot be combined with steam injection, presumably because staged combustion already lowers the gas temperature to the range where thermal $NO_x$ is mostly suppressed. The staged combustion method for gas turbines is also called "Dry Low $NO_x$ Emission, DLN". For example, such a method is used in the LM Series of commercial gas turbines of the General Electric Company that are rated at 13.7 to 47.3 MW output. However, instead of a single pre-combustion chamber, (as described by Lefebvre, pages 491–497), the combustion products from several dozen small pre-combustion chambers, arranged in a circle at the upstream end of the main combustion chamber, exhaust into primary chamber, for final combustion with the bulk of the combustion air. This GE turbine yields a nominal 25 ppm $NO_x$ and 25 ppm of CO at 15% $O_2$ with natural gas and 42 ppm $NO_x$ with oil.

Also, Schorr (M. M.Schorr, "Gas Turbine $NO_x$ Emissions", GE Company Document GER 4172, September 1999) states that recent large utility scale GE turbines can achieve $NO_x$ levels as low as 9 ppm at 15% $O_2$ with DLN. Other gas turbine manufacturers supply similar "dry" staged combustion systems. The GE system can be retrofitted to earlier LM turbines by replacing part of the combustion chamber. This procedure is very complex and costly. Schorr also notes that the Selective Catalytic Reduction, SCR, process, which is placed at the turbine exhaust and can achieve the lowest $NO_x$ levels reported to date, namely 5 ppm, or less, is not suitable for simple cycle turbines because the exhaust temperatures are too high for the catalyst. They are primarily suited for combined cycle application. He also notes that even minute quantities of sulfur in the fuel can have very detrimental impact of the SCR system. It is also to be noted that the SCR process is much too costly for peaking turbines that are used for short periods each year.

Older gas turbines were equipped with un-cooled metal turbine wheel blades that cannot withstand direct contact with the combustion gases whose temperatures are well in excess of 2000° F. Even modem turbines with cooled blades cannot operate with gas temperatures above 3000° F. Consequently, part of the compressor air is directed to regions downstream of the primary combustion zone to cool the combustion gases to temperatures compatible with turbine materials. Lefebvre (Chapter 1), and Statler (U.S. Pat. No. 5,784,875, FIG. 1) show typical combustion chamber designs. In fact, Jennings and Rogers (B. H. Jennings & W. L Rogers, "Gas Turbine Analysis and Practice", McGraw-Hill, N.Y., 1953, FIG. 9–11, page 386) show that the basic design concepts for gas turbine combustors have not changed since the invention of the modem gas turbine in the 1930's.

Figure 1A:
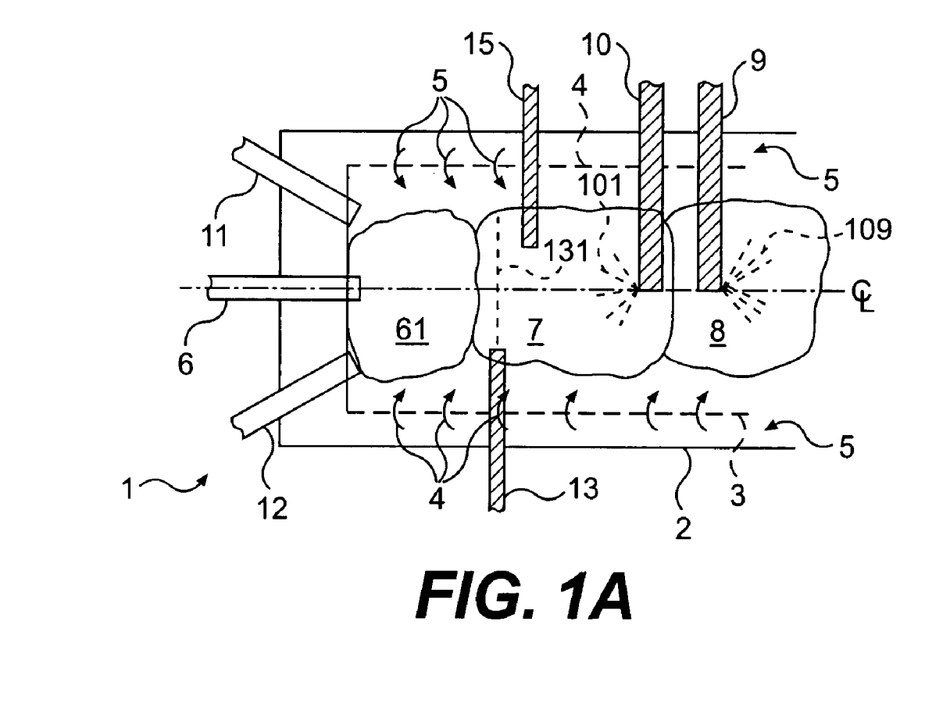
FIGS. 1A and 1B are side and rear end view schematic drawings, respectively, of a gas turbine combustion chamber showing the placement of the liquid fuel injector that replaces the existing fuel injector, the water droplet injector, and the injector of droplets containing the aqueous solution of the nitrogen oxide reducing agent.
Figure 1B:
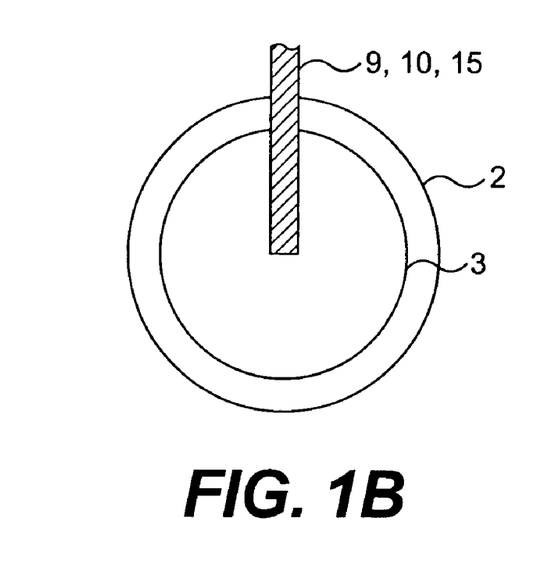

FIG. 1 consists of a combustor 1 having an outer housing 2 that encloses an inner perforated metal combustor liner 3 having numerous slots, and fewer circular and rectangular openings of various sizes 4 around its circumference and along its axial length through which compressed air 5 enters the combustion zone 61, and combustion gas cooling zones 7 and 8, each immediately downstream of the other. The liquid fuel from injector 6 or gas fuel from injector 12 mix with part of the compressor air 5 in zone 61 to effect most of the combustion at stoichiometric air fuel ratios slightly greater than one and achieve the peak combustion gas temperature. Most of the thermal $NO_x$ form in this zone. Additional compressor air enters through the other openings 4 downstream of zone 61 to mix with the primary combustion gases in zone 7 and zone 8 to cool the combustion gases to a temperature low enough to be compatibility with turbine wheel materials. In the prior art water or steam were injected through ports 11 located near fuel inlets 6 or 12. If only liquid fuel is used, the water droplets were in some prior art injected through the gas tubes 12.

Prior art, including the several references cited above, teaches that demineralized water should be using with water or steam injection because some of the constituents in untreated water contain chemicals, such as alkalis, that can deposit on downstream turbine components, such as the turbine wheel, and damage said components. However, for peaking turbines, which are generally older units operating at lower peak temperatures, regular water may be acceptable. The turbine wheels can be cleaned between operating periods. Furthermore, many of these peaking turbines use fuel oil, which also contains undesirable chemicals that require their periodic removal during the shutdown periods.

Another related area is the chemistry of $NO_x$ formation. Liquid fuels suitable for gas turbines contain small levels, typically less than 1%, of nitrogen in the fuel. The combustion of said liquid fuels under excess air conditions leads to the formation of fuel bound $NO_x$. In solid fuels, namely coal, the three primary $NO_x$ precursors that are released in the combustion of fuel bound nitrogen are hydrogen cyanide, HCN, ammonia, $NH_3$, and nitrogen oxide, NO. In fuel rich combustion, these three species are converted to nitrogen. Many researchers have measured the rate of destruction of these species under fuel rich conditions, (e.g. J. W. Glass and J. O. L. Wendt, "Mechanisms Governing the Destruction of Nitrogenous Species During Fuel Rich Combustion of Pulverized Coal", in *Proceedings 19$^{th}$ Symposium (International) on Combustion*, [The Combustion Institute, Pittsburgh, Pa. 1982] p.1243). These rates can be used to approximately estimate the time required to reduce these three species by a specific amount, such as a factor of 10. It was found that as the stoichiometric ratio approaches unity, i.e., proceeds from very fuel rich to fuel leaner conditions, the concentration of NO predominates and the other two species are sharply reduced, (see for example, Y. H. Song, et.al., "Conversion of Fixed Nitrogen in Rich Combustion", in *Proceedings 19$^{th}$ Symposium (International) on Combustion*, [The Combustion Institute, Pittsburgh, Pa. 1982] p.53). Therefore, a conventional fuel lean combustor will produce almost completely NO species.

Calculations were performed for the time needed for a factor of 10 reduction of NO in a Western U.S. coal, using Glass' reaction rates, for two fuel rich stoichiometric ratios of 0.5 and 0.7, i.e. 50% and 30% oxygen deficiency, respectively. Initial concentrations of NO at these stoichiometric ratios were taken from D. P. Rees, et.al., "NO Formation in a Laboratory Pulverized Coal", ", in *Proceedings 19$^{th}$ Symposium (International) on Combustion*, [The Combustion Institute, Pittsburgh, Pa. 1982] p.1305). It was found that temperature was the primary rate governing factor. At 2000° F., a factor of ten reductions required several seconds, while at 2500° F., it required about 0.1 seconds, and at 3000° F., about 0.01 seconds, for both 50% and 30% oxygen deficiency. These calculations apply to combustion at atmospheric pressure. The reaction rates will be much more rapid in gas turbine combustors which operate at high gas pressures. Therefore, a small gas combustion zone where the stoichiometry is slightly fuel rich, such as 10% fuel rich, may be sufficient to convert fuel bound nitrogen to $N_2$. This may account for part of the substantial $NO_x$ reduction observed in gas turbine combustors having pre-combustion chambers.

On the other hand, at atmospheric pressure and temperatures of about 3000° F., and higher, thermal $NO_x$ form in significant quantities at excess air conditions. Again at the higher gas pressure in gas turbine combustors, thermal $NO_x$ formation will form in significant quantities at temperatures below 3000° F. Water or steam injection into this higher temperature zone has been widely used in prior art to lower the combustion gas temperature and inhibit thermal $NO_x$ formation. However, water or steam injection will not be effective with fuel bound $NO_x$.

However, another process, called selective non-catalytic reduction, SNCR, can be used to reduce $NO_x$ derived either from thermal or fuel bound reactions provided the reaction takes place in a specific gas temperature range. SNCR involves the injection of a reagent, primarily urea or ammonia, into the combustion gases in a boiler furnace at temperatures of about 1700° F. to 2000° F., where the $NO_x$ to $N_2$ reaction is favored. This method can achieve in excess of 50% $NO_x$ reduction. However, it is essential to inject the reagent into the proper gas temperature zone in order to minimize un-reacted $NH_3$ carryover from the combustion chamber exhaust into the turbine wheel, where it can react with copper based materials as are found in turbine bearings, and out of the exhaust, where it becomes an atmospheric pollutant. Furthermore, if a liquid fuel is used in the gas turbine and it contains sulfur, any left over $NH_3$ will react with sulfur gas to form liquid compounds that can deposit on metal surfaces downstream of the combustion chamber. It is, therefore, essential to limit and consume the ammonia in the appropriate gas temperature reaction zone of about 1700° F. to 2000° F. For the gas turbine application this gas temperature zone will generally be downstream of both the primary combustion zone and downstream of the water or steam injection zone.

For $NO_x$ reduction by liquid droplet injection throughout the appropriate combustion gas temperature zone in the furnace section of a boiler, Zauderer used (U.S. Pat. No. 6,048,510, Apr. 11, 2000) a droplet injector that produced droplets of varying size that contained urea or ammonia, and vaporized throughout the gas temperature zone of 1700° F. to 2000° F. This SNCR method reduced $NO_x$ emission by up to 50% in the furnace of a boiler.

SUMMARY OF THE INVENTION

The invention discloses a process comprising three steps that alone or in combination reduce the concentration of nitrogen oxides, $NO_x$, in the products of combustion from natural gas or liquid fuel in a gas turbine. The process is implemented in the turbine's combustion chambers. The invention is primarily aimed at certain types of gas turbines that have no or minimal $NO_x$ emission controls. All three steps effect these reductions by using air or hydraulic atomizing droplet injectors that generate droplets of varying size whose mean diameter depends on the specific method used to disperse said droplets throughout the three different zones in the combustion chamber of the turbines. The first step, applicable to liquid fuels, uses one or more injectors to disperse very fine fuel droplets to achieve rapid and complete combustion in a zone immediately downstream of the fuel injectors. The second step uses one or more injectors to disperse water droplets in a zone immediately downstream of the initial combustion zone, with the evaporation of said droplets lowering the gas temperature to a range that suppresses the formation of thermal nitrogen oxides. The third step uses one or more injectors to disperse aqueous droplets containing urea or ammonia to further reduce the residual $NO_x$ downstream of the water droplet injection zone. The design, placement, and operation of the injectors used by the three methods achieve high nitrogen oxide reductions.

In an alternate to step three, additional fuel is mixed with a nitrogen oxide reducing agent and it is injected in zone three to convert the combustion gases to slightly fuel rich conditions, which reduces $NO_x$ as does the $NO_x$ reducing reagent, ammonia or urea. The benefit of this combined alternate step three is that the urea or ammonia will be totally destroyed, thereby eliminating the possibility of ammonia corrosion on downstream turbine components. Final combustion occurs with mixing with compressor outlet air immediately downstream of zone three.

DISCLOSURE OF INVENTION

The design, placement, and operation of the injectors used by the methods of the invention achieve high nitrogen oxide reductions. The methods of the invention involve inserting into the combustion chamber three groups of specialized injectors each of which will act to reduce $NO_x$ emissions. They can be combined to maximize the emission reductions. However, the known prior art teaches away from a preferred location of water droplet injection, which the present invention discloses is downstream of the initial fuel-air mixing and combustion zone. The placement of the injectors of the invention allows combustion to efficiently reduce unburned hydrocarbons and carbon monoxide and limits the extent of the gas temperature zone at which the rate of thermal NOx formation becomes substantial.

It is noted that the $NO_x$ reduction method that involves injection of a $NO_x$ reducing reagent into the downstream end of the combustion chamber that is disclosed in the present invention can be combined with either the steam/water injection or staged combustion $NO_x$ reduction methods of the prior art to effect further reductions. Also, the droplet injection method of Zauderer (U.S. Pat. No. 6,048,510, Apr. 11, 2000) may be used with the invention. Zauderer is incorporated in its entirety herein by reference.

Referring to FIG. 1, the first method, applicable to liquid fuel fired combustors, involves replacing existing fuel injectors with injectors that produce smaller droplets, which accelerates the combustion process in the combustor zone 61 immediately downstream of the fuel injectors. This will reduce the residual unburned hydrocarbons and carbon monoxide, and minimizes the formation of thermal $NO_x$. The second method uses water droplet injectors that are inserted at the edge of zone 7, immediately downstream of zone 61, to disperse varying size water droplets throughout zone 7 and cool the combustion gases to temperatures at which thermal $NO_x$ formation is suppressed. The third method uses similar injectors inserted at the edge of zone 8, immediately downstream of zone 7, to disperse varying size aqueous droplets containing a dissolved $NO_x$ reducing agent throughout said zone 8, where the gas temperature is in a range favoring further reduction of $NO_x$ by said reagent.

The invention describes a process consisting of three steps for optimally introducing in different locations of the combustion chamber of a gas turbine, liquid fuel droplets, water droplets, and liquid droplets consisting of an aqueous solution containing a $NO_x$ reducing agent. The function of the three injection steps is to improve the combustion efficiency, suppress thermal $NO_x$ production, and reduce the $NO_x$ concentration by reaction with a reducing agent.

All three steps are designed for use in existing gas turbines that are fired with liquid fuels, such as kerosene, light fuel oil, or heavy fuel oil, and have no existing means to reduce the NOx emissions. The last two steps are also suitable for natural gas fired turbines.

For gas turbines that have early versions of staged combustion chambers such as cited in the "Prior Art" section of this invention (Lefebvre, page 488–489), the liquid fuel droplet step of the present invention is not needed. However, one or both of the last methods are suitable for additional $NO_x$ reduction. For the most modern gas turbine combustors that have staged combustion chambers, designated as "Dry Low $NO_x$" combustors, such as turbines that can achieve NOx emissions as low as 9 ppm at 15% $O_2$, the second water droplet injection step of the present invention can also be dispensed with. However, the third step may still be suitable to further reduce $NO_x$, in case of natural gas firing, or in case of liquid fuel firing where the $NO_x$ emissions are higher than with natural gas, and where the presence of sulfur in the liquid fuel, precludes the use of the high $NO_x$ reducing Selective Catalytic Reduction, SCR, process. Also, the third step maybe suitable in simple cycle gas turbines whose high exhaust temperature precludes the use of SCR.

FIG. 1 shows how the present invention can be practiced in the combustion chamber of a gas turbine. It is understood that gas turbines used to drive an electric generator are generally used for electric outputs in excess of 1 MWe. As such these turbines have multiple combustion chambers. Therefore, the configuration shown in FIG. 1 will also be used in the other combustion chambers in the gas turbine.

Several of the features of FIG. 1 were described in the prior art section because they are common to all gas turbine combustors. The new features for practicing the present invention are as follows:

When a liquid fuel is used, the existing fuel injector 6 is replaced with a design shown in FIG. 2. The purpose of the new injectors is to inject fuel droplets of varying size, with a mean size small enough to achieve complete combustion in region 61 immediately downstream of the fuel injection point. The combustion air 5 is supplied to the chamber by openings 4 located along the entire wall of the combustor liner 3. In prior art, the water droplet injector used to cool the combustion gas and reduce thermal NOx production is located at 11 near the liquid fuel injector 6 or the gaseous fuel injector 12. For liquid fuel operation, the gas injector ports 12 are sometimes used in prior art for water droplet injection.

For the present invention, injection of the water droplets takes place through injectors 10, described in FIG. 2, that are inserted into the combustion chamber at the downstream end of combustion zone 7 with the droplet spray pattern 101 facing upstream into the direction of zone 7. This configuration allows the water droplets to cool by evaporation the combustion gas in zone 7 from a temperature high enough to produce substantial thermal $NO_x$ to one that is low enough to suppress said thermal $NO_x$ production. Zone 7 is so located that the cooling from the water droplets has minimum impact on the initial combustion zone 61, thereby allowing combustion of the fuel to proceed toward a high degree of completion prior to the gas entering the colder zone 7. This minimizes unburned hydrocarbons and carbon monoxide. With water injection from the upstream end of the initial combustion zone 61, as practiced in prior art, the simultaneous initial combustion and water induced cooling increases formation of the latter two species. It is understood that it is also possible to locate injector 10 at the interface between zone 61 and zone 7 and rotate the spray 101 in the downstream direction. This step may be preferable if smaller droplets, such as are produced by air atomization, are used in place of much larger droplet produced primarily by hydraulic atomization.

Further downstream, in combustor zone 8 the gases have cooled to the 2000° F. to 1700° F. range where the SNCR process is effective. Consequently, one or more aqueous droplet injectors 9 are inserted in the interface between zone 7 and 8 to disperse droplets containing the SNCR reaction chemicals. The resultant spray pattern 109 faces in the downstream direction in zone 8 enabling further NOx reduction by the SNCR process. Here also, injector 9 can be placed at the downstream end of zone 8 and inject the spray 109 in the upstream direction.

An alternatively to injectors 9 or 10, which produce a conical spray that intersects the cross-section of zones 8 or 7, respectively, an injector 13 that produces a flat fan spray 131 that intersects either zone 7 at its interface with zone 61 or intersects zone 8 at its interface with zone 7 can be inserted into chamber 3.

A high temperature alloy sheathed thermocouple 15 is inserted into combustion chamber 1 through one of the numerous openings in combustor wall 3 to measure the location where the gas temperature is in the range needed for rapid reaction of the SNCR process. In reducing this invention to practice, it was determined that by measuring the cumulative area of the various holes 4 through which compressor output air 5 flows into chamber 3, one can determine the axial location at which the combustion gas temperature is in the desired range for either water droplet injection or SNCR operation. This calculation was then confirmed with the insertion of a thermocouple in the test gas turbine that was used to reduce this invention to practice.

Figures 2A, 2B:
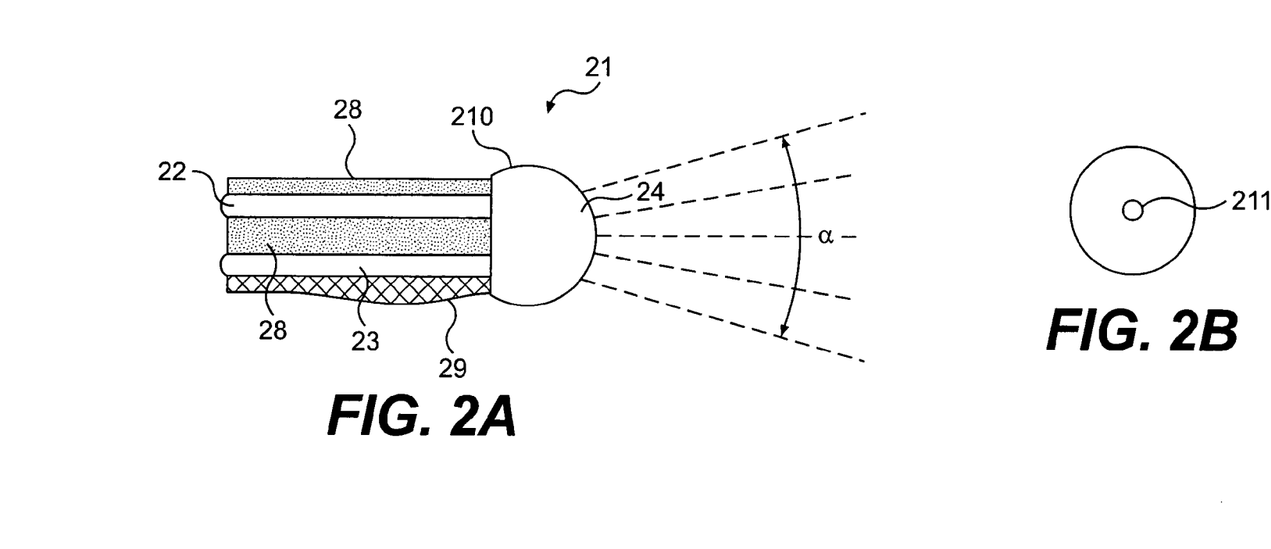
FIG. 2A shows a side view arrangement of parallel air and water feed pipes to the spray injector with external coaxial pipes containing cooling water for both the air and water feed pipes.
FIG. 2B shows the outlet port for the round spray pattern from a single outlet port.
Figure 2C:
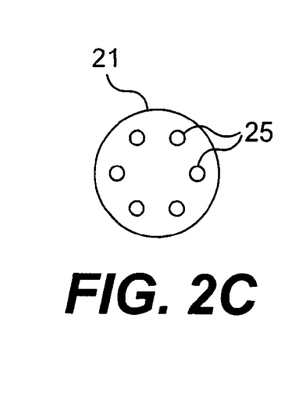
FIG. 2C shows the outlet ports for the conical spray pattern from an injector having multiple outlet ports.
Figures 2D, 2E:
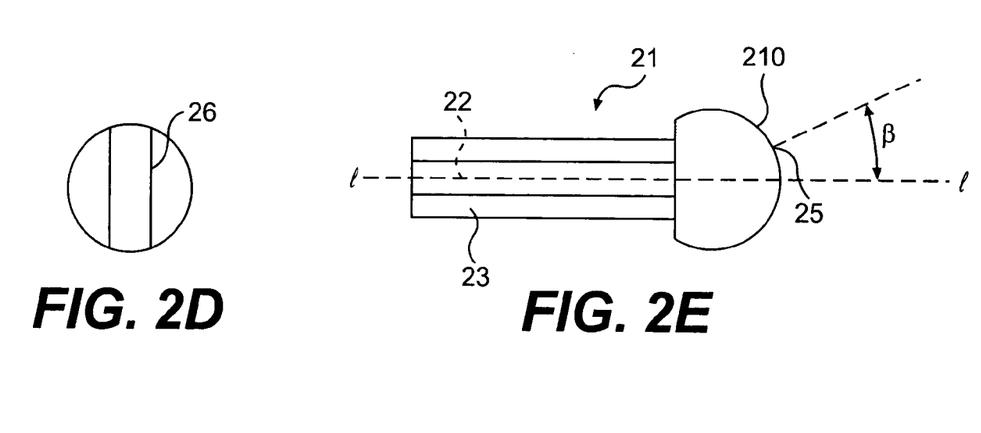
FIG. 2D shows an injector whose slit outlet produces a flat fan spray pattern.
FIG. 2E is a side view of the injector showing the outlet spray pattern corresponding to that of FIG. 2C.

FIGS. 2A and 2E show the design features of the various injectors that are used to inject the liquid fuel, water, and aqueous solution droplets into the gas turbine's combustion chamber. FIGS. 2A–D are schematic drawings of liquid droplet spray atomizers producing various spray patterns. FIG. 2A shows a side view arrangement of parallel air and water feed pipes to the spray injector with external coaxial pipes containing cooling water for both the air and water feed pipes. FIG. 2B shows the outlet port for the round spray pattern from a single outlet port. FIG. 2C shows the outlet ports for the conical spray pattern from an injector having multiple outlet ports. FIG. 2D shows an injector whose slit outlet produces a flat fan spray pattern. FIG. 2E is a side view of the injector showing the outlet spray pattern corresponding to that of FIG. 2C.

Hydraulic injectors in which the liquids are atomized and dispersed in the gas turbine's combustion chamber were used to reduce this invention to practice. Use of hydraulic injectors was necessitated by the small size, 120 horsepower output, of the gas turbine combustion chamber used for this purpose. In fact, the turbine was equipped with a hydraulic fuel injector. Hydraulic injectors can also be used in large, 1 MWe and up, gas turbines. However, the preferred means for practicing this invention is to use air atomized injectors, such as shown in FIG. 2, because it allows production of droplets with substantially smaller mean droplet sizes and with a wide range of droplet diameters. The basic design of the injectors in FIG. 1, namely, 6, 9, 10, and 13, consist of an injector assembly 21, shown in FIGS. 2A and 2E, that contains a pressurized air pipe 22 and a pressurized fuel, water, or aqueous solution liquid pipe 23, which feed to the rear of an injector head assembly 210 that directs the compressed air and liquid to an internal atomizing mixing chamber that has one or more spray outlets 25, 26, or 211 constituting one or more openings, depending on the spray patterns desired, such as shown in FIGS. 2B to 2D.

In FIGS. 2A and 2E, the air pipe 22 and the liquid pipe 23 extend side by side parallel to one another, and for the case where they protrude into the hot combustion gas, such as injectors 9, 10, or 13 in FIG. 1, they are each surrounded by a coaxial and concentric pipe 28 for pipe 22 and 29 for pipe 23 through which cooling water flows in the direction of the internal air and liquid pipe and exits though an annular opening between the end of pipes 28 and 29 and the rear of injector head assembly 210. The resultant water spray exiting through this gap, which is typically less than ⅛ inch in length, discharges into and vaporizes in the combustion gas and it also impinges on the rear of assembly 210, thereby evaporatively cooling it. However, the external cooling pipe around the liquid can be eliminated if the liquid flow rates are high enough to keep the liquid from evaporating in the feed pipes. Also, the air-cooling pipe can be eliminated if the injector 13 is near enough to the combustor wall 3 of FIG. 1 to prevent the liquid from significantly evaporating inside the internal air and liquid atomization chamber. Even injectors 9 and 10, especially, if they consist of multiple injectors inserted in order to intercept the entire cross-sections of zone 7 and 8, can be operated without water cooling of feed pipes 22 and 23 if some of the injectors are nearer to the cooler region of chamber 3 near the wall. Zauderer used this injector cooling arrangement in practicing an invention (U.S. Pat. No. 6,048,510) for $NO_x$ control in large utility boilers, where similar injectors were inserted over 6 feet into the nominal 2000° F. gas temperatures in the boiler. It is understood that the need for this outer cooling jacket and its design will be determined by analysis of the heat transfer conditions for each gas turbine in which this invention will be practiced, using heat transfer analyses readily available to those experienced in such analyses. Therefore, alternate injector cooling arrangements can used that do not detract from the objective of producing the desired droplet size distribution in the gas turbine's combustion chamber.

On key point must be emphasized, namely all components of the injector that are inserted into the combustion chamber must be welded to each other. In reducing this invention to practice it was found that threaded connections were on occasion loosened and pieces of the injector assembly fell off during combustor operation. Said pieces were, subsequent to shutdown, retrieved from the combustor outlet annulus. However, had they been small enough to pass through the nozzle openings to the turbine wheel, their impact on the high-speed turbine wheel, which rotated at 40,000 revolutions per minute, rpm, could have resulted in severe damage to the turbine wheel.

For the present invention, the injector assembly 21 in FIG. 2A is used as follows: For liquid fuel injection, it is inserted in the fuel assembly 6 of FIG. 1 only with the tip of injector head 210 protruding into the gas stream.

For water droplet injection use, it is preferably inserted as injector 10 in FIG. 1 in the centerline of the combustion chamber 3, at the zone 7 and 8 interface, to produce a conical spray 101 facing in the upstream direction, or facing downstream, and inserted between zone 61 and 7. For small combustors, one injector 10 is sufficient to cover the cross-section of the combustion gas in zone 7 being cooled. In large combustors, an array of injectors 10 is installed arranged in a manner so as to provide droplet coverage across the entire cross-section of the region 7 in FIG. 1 being treated. When used as injector 10, the injector head 210 is fabricated at 90° to the air and liquid tube axis. Injector 10 is shown in FIG. 1 with its outlet spray 101 directed upstream. The placement of head 210 in the axial direction is at a point where the spray will cool the combustion gas sufficiently to suppress most or all of the thermal NOx. However, it is not placed so far upstream in the direction of fuel injector 6 as to impede the combustion of the fuel to the point where carbon monoxide production from partially oxidized fuel is enhanced. The optimum axial placement is at a point where NOx reduction is maximized and CO formation is minimized. This placement can either be determined by kinetic modeling of the combustion reactions or preferably by trial and error.

Alternatively, spray 101 from injector 10 can be directed downstream and placed at the interface between zone 61 and zone 7. This may be preferable because the bulk combustion gas velocity vector faces downstream and the gases will entrain the droplets and vaporize them. However, this downstream injection direction requires placing the injector in the hottest part of the combustor and subjecting its materials to higher thermal stress.

Therefore, a third alternative placement of injector 10 is near the inner wall of combustion chamber 3 with the head 210 and spray 24 of FIG. 2A directed in the upstream or downstream direction at interface of zones 7 and 8 or zones 61 and 7, respectively. In reducing this invention to practice in the small, 120 hp, gas turbine, it was observed that the gas temperature decreased precipitously toward the wall direction by over a factor of two from about 2000° F. to 1000° F. The details are given below. For present purposes, placement of the injectors 10 nearer to the cooler wall reduces the thermal stress on the metal at the expense of less effective NOx reduction.

Instead of moving injector 10 nearer to the wall, another alternative is to use the flat fan injector 13 of FIG. 1 to produce a flat spray injector 131 perpendicular to the cross-sectional area being treated by water droplet injection. Injector 13 would be placed at the axial location in the combustion chamber 3 slightly downstream from the region 61 and 7 interface.

The same injector designs are to be used for practicing the third $NO_x$ reduction step disclosed in this invention, namely, the injection of aqueous droplets that contain the $NO_x$ reducing reagent such as ammonia or urea. This injector 9 in FIG. 1 is placed preferably on the axis of the combustion chamber 3 at the interface of zone 7 and zone 8, the interface being the location were the gas temperature is between 2000° F. and 2200° F. The droplet spray pattern 109 faces downstream in the direction where the gas is cooling from the admission of additional compressor output air through openings 4 in the combustor wall 3 that are downstream of the injector, 9, insertion point. The concentration of the ammonia or urea can be in the range of a few percent to the 20% range, and it should be at a mol ratio $NH_3/NO_2$ of unity or $Urea/NO_2$ of 0.5, based on the $NO_x$ concentration at the injection point. In other words, the mol ratio should be sufficient to reduce any $NO_x$ that was not reduced by either staged combustion or water droplet injection. This is especially desirable because ammonia can react with copper based turbine material, it can react with any sulfur in the fuel oil to form liquid deposits on low temperature downstream surfaces, and its emission to the atmosphere in concentrations greater than a few ppm is restricted. For large gas turbines, multiple injectors, 9, can be used. Also, as with injector 10, the injector 9 can be placed at the downstream end of zone 8 at a plane where the gas temperature is about 1700° F., and with spray pattern 109 facing upstream.

Also, as with flat fan spray injector 13 at the interface of zone 61 and 7, the same injector design can be inserted at the interface between zone 7 and 8. The optimum placement must be determined by analysis and trial an error in order to minimize ammonia slip out of the combustor to the gas turbine wheel.

FIG. 2 shows additional details on the injector design and operation. Referring to FIG. 2A, the droplet-laden air or steam 24 flows out of chamber 210 as a conical spray. One spray pattern is a round spray in which the droplet laden air exits from a single orifice 211 out of the mixing chamber 210, as shown in FIG. 2B. This produces a very narrow spray angle α in FIG. 2A. A wider spray angle α can be achieved by using an outlet consisting of a series of orifices 25 placed equidistant at an angle β of 60° to 70° to the nozzle axis 1—1, in FIG. 2E. These spray patterns are used for injector 6, 9 and 10 in FIG. 1. Injector 13 in FIG. 1 uses outlet 26 of FIG. 2D to produce a flat fan spray pattern 131. Zauderer used the three spray patterns in $NO_x$ reduction tests on steam boilers (U.S. Pat. No. 6,048,510). Said patent, which by reference is incorporated herein, also specifies the type of commercially available injectors that can be used, how they must be configured, and how to implement the several injection patterns of FIG. 2.

Zauderer (U.S. Pat. No. 6,048,510) also describes in detail the heat transfer, fluid and gas mechanics, and vaporization process of the droplets that are injected into the hot combustion gases. For present purposes, several points are emphasized. One is that for the liquid fuel injector, the spray pattern produced by the outlet 25 of FIG. 2C is preferred. This will produce the smallest size droplets and consequently the most rapid combustion. Said patent contains analyses of the droplet vaporization process. It shows that due to the low thermal conductivity of liquids, vaporization propagates from the surface to the interior of the droplet. While Lefebvre discusses extensively liquid fuel droplet combustion, he does not mention this point. Consequently, rapid combustion, which is necessary to limit the residence time of the combustion gas in the temperature region where rapid thermal $NO_x$ production occurs, requires the use of very small widely dispersed fuel droplets as available with an injector outlet 25. Furthermore, by the greater dispersion available with multiple outlets 25, it may be simpler to create localized slightly fuel rich combustion zones near the injector outlets. This staged combustion will also reduce $NO_x$, especially that from fuel bound nitrogen.

Said patent (U.S. Pat. No. 6,048,510) also teaches the importance of a wide particle size distribution, which allows penetration of the larger droplets further away from the injector, and assures a large volume for the reaction between the combustion air or combustion gas products with the fuel or injected water or aqueous $NO_x$ reducing solution. Finally, said patent also teaches that the combustion gas will rapidly entrain the droplets to the local gas velocity. On that basis the injection of water droplets using injector 10 with the upstream spray pattern 101 would be much less desirable than injection in the downstream direction. Similarly, the flat fan spray pattern 131 from injector 13 will also be entrained in the gas flow toward the downstream direction. Nevertheless for practicing the present invention, especially in smaller gas turbine combustors, upstream injection of water droplets is preferable due to the limited space of the combustion chamber. For example, in reducing this invention to practice in the 120 hp, gas turbine, much greater $NO_x$ reductions were observed with upstream injection of water droplets along the combustor axis than in all other injection locations and injector outlet designs. As will be explained in the "Examples" section of this invention, the reason for the improved performance in upstream injection is that the large droplets obtained with hydraulic injection contain sufficient momentum to overcome the downstream drag of the combustion gas, thereby allowing said droplets to penetrate deep into zone 7.

Instead of air atomization, injectors with only hydraulic atomization of the liquid can be used to practice this invention. Due to the limited size of the combustion chamber in the 120 hp, gas turbine used to reduce this invention to practice, hydraulic atomization was used. Hydraulic atomization yields substantially larger droplets, as much as a factor of ten, at the same pressure as with compressed air. Consequently, there was insufficient time to fully vaporize the water droplets in the appropriate gas temperature zone, and the results obtained in the test underestimate the performance that could be achieved in a larger turbine with much smaller droplets. To reduce the droplet size with hydraulic atomization requires substantially higher pressures to yield the same particle size as with air atomization. Therefore, the turndown ratio with hydraulic atomization is limited. Also, to disperse the droplets throughout the gas zone being treated with a minimum of injectors, it is essential to select a wide droplet size distribution in which the smaller droplets completely vaporize near the injector and the largest droplets are totally vaporized are the outer limit of the combustion gas zone being treated. Such a wide distribution is more attainable with air atomization than hydraulic atomization.

With the wide particle size distribution attainable with air atomization, the optimum particle size will be best obtained by testing in the subject gas turbine. The analysis on how to compute the appropriate droplet size distribution is described by Zauderer (U.S. Pat. No. 6,048,510). Briefly, the transport of droplets is governed by the equations of motion for a spherical particle subject to aerodynamic drag. Convection, radiation, conduction, and boiling heat transfer govern the vaporization of the droplet in a hot combustion zone.

The droplets, which are at ambient temperature when injected into the hot combustion gas, will remain in the liquid phase until the droplet's surface temperature reaches the boiling point, which depends on the pressure in the combustion chamber. However, even at 20 atmospheres, the boiling point of water is only 415° F., which is much lower than the combustion gas temperatures in the three injection zones. The droplet is heated by convection and radiation from the combustion gas. The rate of penetration of heat into the interior of the droplet is depends on two dimensionless numbers, the Fourier number, Fo, and the Biot number, Bi. Fo is proportional to the thermal diffusivity of the water droplet and the time of penetration, and inversely proportional to the droplet radius squared. Bi is proportional to the product of the droplet radius and the combined surface convective and radiative film coefficient, and it is also inversely proportional to the thermal conductivity of water. For droplets of interest in the present invention, namely between 10 microns and 1000 microns, the low value of the thermal conductivity of water yields a Biot number of about 0.1 when the contribution of radiation is negligible, and less when the radiation contribution is significant. Zauderer (U.S. Pat. No. 6,048,510) presents results for water droplets in this size range, which show that the surface temperature penetrates very slowly into the interior of the droplet. This is due to the low value of the water thermal conductivity.

This is an important result because it indicates that the vaporization of the droplet will proceed from the surface into the interior. Therefore, to assure distribution of the droplets throughout the desired temperature range, the droplet size range should be large enough to allow penetration throughout the desired temperature zones. This will also minimize the number of injectors required, which is extremely important for gas turbine applications. Excessive number of injectors inserted into the combustion chambers may induce flow instabilities that adversely impact the turbine performance. Also, too large droplets will result in vaporization of droplets outside the desired temperature zone. This excess can also result in flow instabilities, and it is one factor in the preference for dry $NO_x$ reduction by gas turbine manufacturers.

Zauderer (U.S. Pat. No. 6,048,510) also provides estimates of the time required to vaporize various size water droplets in atmospheric gases at 2000° F., which is in the range of interest for the present invention. For droplets in the range from 10 microns to 1,000 microns the time increases from 0.3 milliseconds for 10 micron to 92 milliseconds for 1,000 micron, diameter droplets. For the high pressure in gas turbine combustors, this time will be shorter, from which one can deduce that preferably, the droplet size distribution should be in the range of 10 to 100 microns.

The next step is to compute the fluid mechanic aspects of the droplet. A sphere flowing through a gas stream is subject to a drag coefficient that is a function of the Reynolds number of the droplet in the gas. Zauderer (U.S. Pat. No. 6,048,510) presents results for the penetration of droplets from specific commercial injectors that have the design features shown in FIG. 2, and were injected into a combustion gas at atmospheric pressure and 2000° F. temperature.

The depth of penetration is a function of the air pressure (or liquid pressure in a hydraulic injector) used to project the droplets out of the injector. The results showed that droplets of 100 microns penetrated about 2 feet. This indicates that the droplet size range for gas turbines should be in the size range of 10 to 100 microns for the water droplet and aqueous solution injection. On the other hand, for the liquid fuel injection droplets should preferably be in the 10-micron size range because rapid vaporization and combustion is desired. This will limit the combustion residence time in the high temperature, thermal $NO_x$ producing zone. It will allow injection of the water droplets as near at possible to the fuel injection zone thus maximizing the $NO_x$ reduction from this step.

As noted this invention can be practiced with hydraulically atomized injectors, and, such atomizers were used exclusively in reducing part of this invention to practice. In hydraulic injectors, the liquid pressure in the injector head produces the droplets. There are two disadvantages to hydraulic injectors. One is that droplets are substantially larger than with air atomization for the same feed pressure. Two, since the outlet of a hydraulic injector is fixed; increasing the flow rate requires increasing the pressure. Therefore, flow rates below the maximum design pressure will result in poorer atomization and larger droplet. This will result in longer vaporization times, which will slow the liquid fuel combustion process and the most probably will increase the CO formation during the water droplet injection for $NO_x$ control. Large droplets will also increase the time to complete the non-catalytic $NO_x$ reducing reaction, which may result in excessive ammonia slip outside the temperature zone where said reaction is effective. For gas turbines that operate at a fixed power output level these deficiencies can be somewhat overcome by designing the injector for optimum droplet size. Also, in small gas turbine combustion chambers, air atomization may not be physically feasible, which is a major disadvantage because the small combustors require the smallest droplets.

Data provided by a droplet injector manufacturer, (Spraying Systems Co, Wheaton, Ill., Catalog 55, page 9) was used to compare droplet sizes for air atomized and several hydraulic atomized injectors. For the same flow rates, the former produces droplets that are over a factor of 10 smaller. For example, at 40 psig, air atomization at flow rates as low as 0.48 gallons per hour, (gph), the droplet volume mean diameter is 15 microns, while with a fine spray hydraulic atomizer, whose minimum flow rate is 1.8 gph, the droplet diameter is 110 microns. The importance of this result for the present invention is that the $NO_x$ reduction results were obtained with hydraulic atomizers in a very small gas turbine combustion chamber. It is therefore, reasonable to project that with smaller droplets from air atomized injectors, higher $NO_x$ reductions at low CO emissions could have been obtained.

FIGS. 1A and 1B are side and rear end view schematic drawings, respectively, of a gas turbine combustion chamber showing the placement of the liquid fuel injector that replaces the existing fuel injector, the water droplet injector, and the injector of droplets containing the aqueous solution of the nitrogen oxide reducing agent. Each of the injector groups include single or multiple individual injectors, depending on the dimensions and thermal rating of the gas turbine combustion chamber.

An alternate step from the above for $NO_x$ control is to inject additional fuel mixed with the nitrogen oxide reducing agent through injector 9 in FIG. 1A. Injection of additional fuel converts the combustion gases flowing into zone 8 from zone 7 to slightly fuel rich conditions, which reduces $NO_x$, as does the reducing agent. One benefit of this combined step is that the urea or ammonia will be totally destroyed, thereby eliminating the possibility of ammonia escaping into the downstream end of the combustor and causing corrosion on downstream turbine components. In this alternate step the compressor air 5 entering the combustion chamber through openings 4 in liner 3 immediately downstream of zone 8 is used for final combustion. Also, the upstream openings 4 in liner 3 surrounding zone 61 and 7 must be reduced to assure that the air stream 5 entering primary combustion zone 61 provides only sufficient air for complete burnout of the primary fuel, and that the air 5 entering zone 7 through openings 4 also are greatly reduced so as not require excessive additional fuel in zone 8 to convert the combustion gases locally from fuel lean to fuel rich conditions. Typically this additional fuel should be less than 10% of the total fuel input to the combustion chamber. The procedures and method by which this additional fuel is injected into the combustion chamber is similar to the description by B. Zauderer (U.S. Pat. No. 6,453,830 B1, Sep. 24, 2002, "Reduction of Nitrogen Oxides by Staged Combustion in Combustors, Furnaces, and Boilers"), which by reference is incorporated herein. The method by which the $NO_x$ reducing agent, urea or ammonia, is mixed with the liquid fuel that is added through injectors 10 or 13 in FIG. 1 is described below in the examples. Briefly, these reagents, in concentrations equal to the mol ratio of $NO_x$ formed in the combustion chamber, are dissolved in methanol or kerosene and then mixed with the fuel oil. Injection of this additional "reburn" fuel has reduced $NO_x$ by as much as 50% in a post-primary combustion chamber, (Zauderer, U.S. Pat. No. 6,453,830 B1). Also, injecting said $NO_x$ reducing reagents in a slightly fuel rich zone not only reduces all the residual ammonia but it also allows the $NO_x$ reducing reaction to proceed at several 100° F. above the typical upper temperature limit of about 2200° F. for $NO_x$ reduction with urea or ammonia. This improves the efficiency of the combustion process in allowing higher gas temperatures to enter the turbine wheel. Eliminating the "ammonia slip" is extremely important not only for corrosion prevention of downstream copper components but also to eliminate ammonia emissions into the atmosphere. Further details on this latter issue are discussed in B. Zauderer (U.S. Provisional Patent Application, "Total Reduction of Sulfur and Nitrogen Oxides, Volatile Trace Metals, Including Mercury, Dioxins and Furans from Coal and Solid Fuels Combustion in Furnaces and Boilers", filed U.S. provisional application No. 60/430,090, which by reference is incorporated herein in its entirety.

There is a possibility that mixing the $NO_x$ reducing agent and the "reburn" fuel prior to injection into the combustion chamber could result in the region of excess air immediately downstream of the injection zone in the formation of $NO_x$ as the gas temperature increases from combustion of the reburn fuel. In that case a second injector (not shown in FIG. 1 but of essentially similar design as injector 9) will be placed slightly downstream of injector 9, with the exact location to be determined by test. This second injector 9 injects said $NO_x$ reducing solution to produces a similar conical spray 109 facing downstream of the reburn fuel injector. By separating the injectors 9 one is assured that injection of the reagent occurs in a region where the local gas condition is fuel rich. Alternatively, the flat fan spray reagent injector 13 could be used to produce a flat fan spray perpendicular to the combustor axis in place of the single or dual injectors 9. It being understood that all the injectors cited in connection with FIG. 1 can be single or multiple injectors with the number depending on the size of the combustion chamber.

EXAMPLES

Tests in a Small Gas Turbine

The $NO_x$ reducing potential of the present invention was evaluated in a series of about four-dozen short duration tests in June through August 2001 using a 120 hp gas turbine of the late 1950's. It had originally been used to start Naval jet aircraft. Solar Aircraft manufactured this Model No: GTC85-6 turbine. It was designed to drive a 70 kW 400 hz generator, a 12 kW 6-hz generator, and to provide compressed air drawn from a bleed valve at the compressor outlet. An earlier design of this engine is described by Jennings (loc. cit. Sec. 8–15). For the present tests, the unit was operated without the generators, and with the compressor bleed air providing a partial load on the turbine. The key component for the present $NO_x$ tests is the combustion chamber. It consisted of a perforated high alloy cylinder, 4 inches in diameter and 12 inches long. One end of the chamber terminates in a dome, at whose top has a hydraulic fuel nozzle. The other end of the chamber inserts into an annulus that is connected to a circular torus chamber on whose outer diameter are the nozzles that drive the turbine wheel. This combustion cylinder is inserted into a 5.25-inch diameter housing, and the annulus between this housing and the 4-inch diameter combustion cylinder is connected to the compressor outlet air. The combustion cylinder has 18 circular rows of slots regularly spaced along its axial length. Each slot is about 0.1 inch long in the axial direction and about 0.45 inches long along the circumferential direction. In addition, the combustion cylindrical chamber has three circumferential rows of circular holes and one circumferential row of rectangular holes. The compressor air flow surrounds the combustion cylinder. The slots provide air jet air-cooling to the inner combustor wall as well as part of the combustion air. The balance of the air enters through the circular and rectangular holes in the 4-inch diameter cylinder. In operation, initial combustion begins in the dome at near stoichiometric conditions, and as the combustion gases expand down the combustion cylinder, the additional air cools the gases to temperatures in the 1100° F. to 1400° F. range, which is compatible with the turbine wheel material.

The hydraulic nozzle is a detriment to practicing this invention because, as noted above, hydraulic atomization yields large fuel droplets. With no bleed of the compressor air, the fuel feed pressure was 100 psi, while with the bleed air on, the pressure rose to 150 to 160 psi. Based on hydraulic data provided by Spraying Systems Co., these pressures should produce droplets in the many 100's of microns in diameter.

The fuel feed rate in the tests was 23 gph, yielding a heat input of 3.4 MMBtu/hour. As noted, the only load on the turbine was the compressor bleed air. All the $NO_x$ tests were performed with one setting of the compressor bleed, which lowered the $O_2$ in the turbine exhaust from a nominal 18% to a nominal 15% $O_2$, which equals to a stoichiometric air-fuel ratio SR of about 3.4.

Since the objective was to evaluate many different injectors and injection locations, each test condition was limited to 10 minutes, or less, of operation. Ignition generally occurred in about 10 seconds, with a maximum of 20 seconds. The response time of the gas-sampling instrument, which was about 1 minute, was the controlling parameter for the duration of each test condition. Kerosene was used for the tests, due to its clean combustion and rapid ignition. However, in one set of tests, 87 Octane automotive gasoline was used for one set of tests, followed immediately with kerosene with the engine still running, and finally with No. 2 heating oil. The objective of these different fuel tests was to measure its impact on $NO_x$ and CO production.

In all cases, rapid ignition was important because the water spray could not be turned on until combustion has been fully established. Otherwise, the water extinguished the flame, and a large smoke plume emanated out of the turbine exhaust. Without cooling, the injector was rapidly overheated and in several cases portions of the injector melted or the threaded fitting that connected the injector head to the liquid feed tube uncoupled. The rapid ignition allowed opening the water injection in a matter of seconds after full ignition.

The $NO_x$ tests were divided into several groups. In the first group, a small quantity of a 29% aqueous solution of $NH_3$ or a 20% aqueous solution of urea was mixed with the kerosene to yield about a 0.5% concentration of urea or $NH_3$ in the kerosene. Since water is not soluble in kerosene, additional tests were performed where the aqueous solutions were first mixed with either methanol or isopropyl alcohol to reduce the aqueous solution to 20% of the combined mixture. This in turn was mixed with the kerosene. The concentration of either ammonia or urea was fixed to produce a mol ratio of unity of the urea or $NH_3$ to the $NO_2$ at the turbine exhaust. This typically resulted in a 0.5% concentration of urea or $NH_3$ in the kerosene.

A typical baseline $NO_x$ concentration at the turbine exhaust, with the compressor bleed as a load, was 41 ppm at 15.8% O2, which equals 0.21 lb/MMBtu. The CO was in the range of 280 ppm, which is consistent with poor combustion due to the large fuel droplet size.

In the tests with urea or $NH_3$ mixed with the fuel, the $NO_x$ emissions increased by 17% with $NH_3$. With urea the increase was 73% to 71 ppm at 15.8% $O_2$, or 0.38 lb/MMBtu. It had been assumed that due to the large fuel droplet size, some of the $NH_3$ or urea in the largest fuel droplets would transit the hottest part of the combustion zone near the combustor dome, and reach the cooler, less than 2200° F., gases downstream and react to reduce the NOx. Instead it appears that all the fuel was gasified in the hottest zone 61 of FIG. 1 and the urea and $NH_3$ were released at temperatures above 2200° F., where the reaction reverses and produces $NO_x$, instead of reducing it.

However, it is possible that with fine atomization and multiple fuel injectors of the primary fuel, some of the fuel could be mixed with urea or $NH_3$ and injected away from the hottest part of the combustion chamber to reduce the $NO_x$.

An alternate and preferred approach would be to mix an aqueous ammonia solution or an aqueous urea solution with isopropyl alcohol or methane in the ratios used in these tests, and inject the mixture downstream in zone 8 using injectors 9 or 13 of FIG. 1. The advantage of this approach is that the quantity of injected liquid would be much reduced, and the water content would be tied up in the alcohol or methane. This could reduce any problems associated with using water injection in gas turbines as well as any problems associated with ammonia slip. It would also eliminate the problem of too dilute a solution of urea or ammonia impacting the desired temperature for the $NO_x$ reducing reaction to proceed. For example, with water droplet injection upstream in zone 7, the gas temperature is reduced to the range where the urea/ammonia-$NO_x$ reducing reaction is effective. Therefore, a too dilute urea/ammonia solution would cool the gas below the temperature at which this reaction is effective. Therefore, using the reagent aqueous solution mixed with isopropyl alcohol or methane or any similar combustible liquid would retain the gas temperature in the proper range. A further benefit is that the quantity of reagent liquid to be injected would be much reduced.

It should be noted that an air atomized droplet injector such as manufactured by Spraying Systems can be attached to the present gas turbine combustor in place of the existing hydraulic injector. Its use would almost certainly sharply reduce the CO concentration because the 10 to 100 times smaller droplets greatly increase the combustion rate. Since the injection of water droplets, to be described next, increases CO, more efficient fuel combustion would lower the initial level of CO, and therefore reduce the final increase of CO from the water droplet injection.

The next series of tests focused on the other $NO_x$ reduction steps of this invention, namely, water droplet injection and injection of aqueous ammonia into the combustion cylinder. Since the latter step is only effective in the temperature range of about 1700° F. to 2200° F., the droplet injectors were all inserted at a location in the combustion chamber where this temperature existed. Referring to FIG. 1, this location was calculated by assuming that the local stoichiometric ratio, SR, of the combustion gases along the combustion cylinder 3 in FIG. 1 would decrease linearly away from the fuel nozzle with the penetration of the compressor output air through the various holes 4 in said liner. Based on this calculation, a ¼ in diameter hole was drilled in the outer wall 2 of the combustion chamber at a point opposite an existing ⅝ inch diameter hole in wall 3. An Inconel sheathed type K thermocouple was inserted through the opening and the combustion gas temperature was measured. The temperature on the axis was in the range of 2050° F. to 2100° F., as calculated. However, the temperature dropped sharply as the thermocouple was retracted toward the inside of wall 3. Near said wall the gas temperature was between about 650° F. to 700° F. This compares with a compressor outlet temperature of 260° F. to 300° F. The low temperature near the inner wall is partly due to the colder compressor air entering through the numerous openings in the wall.

However, based on the $NO_x$ measurements from water droplet injection near the inner wall, to be reported below, it is clear that a very high degree of gas re-circulation occurs inside chamber 3. The cooler gases near the inside wall are re-circulated upstream toward the dome of the combustion chamber where it mixes with the hot gas products of combustion. This near wall re-circulation occurs very strongly in cyclonic combustion chambers where the outlet diameter of the chamber is smaller, usually by 50%, than the combustor diameter (Zauderer, U.S. Pat. No. 4,624,191). In the cyclone combustor, this re-circulation is aided by swirl, and analytical modeling of such flows has shown that re-circulation can exist even with a constant diameter, namely, no outlet restriction in the cyclone combustor. Due to the numerous entry points of the compressor air into chamber 3 of FIG. 1, the probability of some swirl cannot be discounted. This would also explain the observed gas re-circulation.

This re-circulation effect is salient to the practice of the present water droplet injection step, and teaches away from the prior art where the droplet injection occurs at the closed, fuel injection end of the combustion chamber. Injecting near the fuel means that the probability is very high that the water droplets will be entrained into the primary combustion zone, aided by re-circulation. Consequently, the water will inhibit rapid combustion of the fuel, irrespective whether gaseous or liquid are used. This will increase the undesirable increase of CO from partially oxidized fuel. On the other hand, in the present invention, the water droplets are injected directly along the axis of the combustion chamber in the region downstream of the initial combustion zone, said region being the one that must be cooled to reduce thermal $NO_x$.

To determine the effect of the water injection on the performance of the gas turbine, a bare, type K thermocouple was placed on the axis of the gas turbine, about one diameter downstream of the turbine wheel outlet. The turbine exhaust temperature was between 1130° F. and 1200° F. for all the four-dozen tests, and no substantial difference was noted due to the water injection.

Droplet injectors, 9, or 10, or 13 of FIG. 1, were inserted through a 0.7-inch diameter hole that was cut through the combustor housing 2 opposite an existing ⅝-inch hole in chamber wall 3. Some of the droplet injectors were inserted directly through this hole. Other injectors, especially those with a spray outlet that was 90° to the feed pipe axis, were first inserted into chamber 3 when it was removed from the turbine. A wire was then used to pull the feed pipe through both holes and attach it to the water supply hose externally to the combustor wall 2.

Over four dozen droplet injection tests were conducted with different hydraulic injector designs, with different injector orientations, with different liquid flow rates, and with different concentrations of urea or $NH_3$ dissolved in water. The following summarizes the results and shows how this invention is to be practiced. It is understood that each of the following groups of tests summarized the results of from several to as many as a dozen different tests.

1-Droplet Injection Perpendicular to the Combustor Axis: All the tests in this group used hydraulic injectors that produced a solid conical droplet spray as in FIG. 2B, said cone axis being perpendicular to the combustor axis, or a flat fan droplet spray as in FIG. 2D, said plane being perpendicular to the combustor axis. Several different commercial injectors were used to produce the conical spray. Each of these injectors, 13 in FIG. 1, was inserted through the opening in combustor housing 2 that faces an opening 4 in combustor liner 3. The injector outlet was inserted to various depths into chamber 3 in ½ inch increments from the inner wall 3 to the centerline of the combustion chamber 3. The insertion point was at a location where thermocouple measurement showed that the combustion gas temperature was in the range of 2000° F. to 2200° F. on the axis of chamber 3. The liquid was pumped with either a single ⅓ hp, 8 stage centrifugal pump, Grainger Model No. 2P372, rated at up to 3.5 gpm at 80 psi, or with a pair of said pumps in series, which reached pressures as high as 140 psi.

a) Water Droplet Injection: For water flow rates up to 30 gph injected perpendicular to the combustor axis and a kerosene fuel flow rate of 23 gph, no significant change in the $NO_x$ emissions from the baseline of 0.21 lb/MMBtu, or 41 ppm at 15% $O_2$, was measured. This negative result was obtained with the flat fan or the conical spray injector. Even with the water flow rate as high as 46 gph and with a conical spray pattern, only 12% reduction $NO_x$ reduction to 0.18 lb/MMBtu was measured. However, the CO increased from about 270 ppm to 452 ppm. This result showed that water droplet injection perpendicular to the combustor axis in this location, the interface between zone 7 and zone 8, where the temperature is about 2000° F. to 2200° F. is ineffective.

b) Droplet Injection of Aqueous Urea/$NH_3$ Solution: In this series of tests the injector 13 of FIG. 1 utilized an aqueous solution of $NH_3$ or urea with the same conical or flat fan spray pattern injected perpendicular to the combustor axis. The total liquid flow rates were in the same range as in the above water droplet injection cases. The concentration of urea or $NH_3$ yielded a mol ratio of unity over the untreated $NO_x$, (namely 0.21 lb/MMBtu). This resulted in concentrations of 0.25% to 0.5% at total aqueous flow rates of between 18 and 40 gph. Unexpectedly, the $NO_x$ concentrations at the turbine exhaust increased by as much as a factor 3.6 times over the untreated level to 0.76 lb/MMBtu, or 147 ppm at 15.2% $O_2$. In all these tests, the $NO_x$ levels were higher than the untreated readings, by 40% to 360%. Injection was at gas temperatures of 2200° F., or less, in the central core of combustion chamber 3. At this temperature, the $NH_3$ or urea reactions should reduce $NO_x$ to $N_2$. It is only above this gas temperature that the $NH_3$ or urea reactions increase $NO_x$ formation.

The most probable conclusion from this result is that is that re-circulation of the gas flow nearer to the inner wall of combustion chamber 3 occurs toward the upstream fuel injection dome of the combustion chamber 3 of FIG. 1. Here the re-circulated gas mixes with the higher temperature combustion gas in the initial combustion zone 61 of FIG. 1 whose high temperature converts the urea or $NH_3$ to $NO_x$. This effect was discussed above in connection with the gas dynamics in the gas turbine combustor and in the cyclone combustor. The present result confirms this hypothesis.

Additional tests were conducted with different very low capacity injectors 13 inserted to produce a spray 131 perpendicular to the combustor axis, and rated in the 1 gph to 3 gph range. The $NH_3$ concentration in the aqueous solution was increased to 6% in order to retain a mol ratio of $NH_3$ to NO2 of unity. These small injectors produced smaller droplets in the 100-micron range compared to the 700 to 1000 micron range of the larger injectors. No measurable change in the $NO_x$ concentration in the turbine exhaust was measured with these smaller injectors. Injection at this interface between zone 7 and 8 should have entrained the droplets into the lower gas temperature zone 8 where the $NO_x$-urea/$NH_3$ reactions are effective. A possible explanation for this result is that injection perpendicular to the combustor axis does not widely disperse the droplets through the central core of the combustor, where the temperature is apparently in the range where the $NO_x$ reducing reaction with urea or $NH_3$ is effective.

2-Droplet Injection Upstream & Downstream Along the Combustor Axis: The previous results indicated that droplet injection perpendicular to the combustor axis was not effective in reducing $NO_x$ with either water droplet injection or droplets containing $NH_3$ or urea. Even the flat fan spray, which was found to very effective in reducing $NO_x$ in boilers (U.S. Pat. No. 6,048,510), was ineffective in the gas turbine combustor, presumably due to the extensive gas re-circulation. The present test series evaluated the effectiveness of injection along the combustor axis with the injector 10 facing upstream to produce a conical spray 101 and/or the injector 9 facing downstream to produce a conical spray 109 in the downstream direction.

A key challenge in these tests was to develop an injector that would function in the confined space of the combustion chamber and survive the 2000+° F. gas temperature. Initial attempts utilized an injector consisting of a ⅛ or 1/16 outside diameter stainless steel tube that was bent 90° and inserted through the side of the combustion chamber through the opening that was used for injector 13. The inside diameters of the tubes were selected so as to yield a flow from 1 gph to about 5 gph. However, these tubes did not produce a satisfactory spray pattern, even when the tube outlet was flattened to obtain a flat fan spray. Also, at the lower flow rates the cooling of the tubes was insufficient to prevent them from melting.

Consequently, the several dozen tests were performed with a commercial spray nozzle from Spraying Systems, whose conical outlets are at 90° to the threaded pipe inlets. The three injectors utilized were:

A Model ⅛ inch pipe inlet-A-0.5 nozzle, which produced a hollow cone spray of about 700 micron mean diameter droplets at flow rates between 4.2 gph at 20 psig and 8.4 gph at 80 psig.

A Model ⅛ inch pipe inlet-GA-2 nozzle, which produced a solid cone spray of about 700 micron mean diameter droplets at flow rates between 16.8 gph at 20 psig and 31.8 gph at 80 psig.

A Model ⅛ inch pipe inlet-GA-3 nozzle, which produced a solid cone spray of about 1000 micron mean diameter droplets at flow rates between 25.2 gph at 20 psig and 47.4 gph at 80 psig.

The tests were conducted at two ranges of flow rates:

The lower flow rates of less than 10 gph were obtained with the ⅛-A-0.5 nozzle, which was used to test the impact of $NH_3$ or urea solutions on the $NO_x$ concentration in the combustion chamber. As with injection perpendicular to the combustor axis discussed above, these low flow rates were insufficient to significantly impact the $NO_x$ concentration.

The higher flow rates from 18 to 46 gph were obtained with the ⅛-GA-2 or ⅛-GA-3 nozzle to reduce the $NO_x$ by water injection only. A few tests were also conducted with 0.5%, or less, concentration of $NH_3$. As with all the tests, the fuel flow rate was 23 gph.

a) Low Flow Axial Injection Tests:

The low flow tests, with the A-0.5 nozzle, were conducted at flow rates of 7 gph, with 2% $NH_3$ in solution. This nozzle, shown as 10 in FIG. 1, inserted either facing upstream on the combustor axis, or as nozzle 9 facing downstream. The spray direction 101 or 109 was achieved by rotating the ⅛-inch pipe fitting by 180°. For either spray direction, the result was the same, namely the $NO_x$ concentration increased by 78%, to 0.38 lb/MMBtu, or 80 ppm at 15.5% $O_2$, from the 0.21 lb/MMBtu baseline. The results in the upstream direction were anticipated in that injection takes place into the hotter, (greater than 2200° F.), combustion zone 7 in FIG. 1, where the $NH_3$ reaction increases $NO_x$. On the other hand, the identical result with downstream, cooler gas direction was unexpected. Since injection was along the axis in the downstream direction into zone 8 of FIG. 1 where the gas temperature was below 2200° F. zone $NO_x$ should have been reduced by the $NH_3$. One explanation is that the local gas temperature at injection on the combustor axis was higher than 2200° F. and the injected $NH_3$ was converted to $NO_x$. Another explanation is that despite downstream injection on the axis, sufficient gas re-circulation occurs from the combustor axis to the cooler gas regions along the wall followed by mixing with the hotter gas upstream region 61, where the injected $NH_3$ is converted to $NO_x$.

Another interesting result from the ⅛-A-0.5 nozzle injection tests is that the CO concentration decreased substantially from the baseline case of 270 ppm to 219 ppm despite the large increase of $NO_x$ from 0.21 lb/MMBtu to 0.38 lb/MMBtu. This is the exact opposite of the effect observed in the present test effort and in the prior art, where CO increased when $NO_x$ was reduced by water injection only.

Despite the fact that the $NO_x$ concentration increased, instead of decreasing, with the injection of $NH_3$ or urea, this result is important. It shows that the $NH_3$—$NO_x$ or urea-$NO_x$ reactions rates are fast enough for large changes in concentration, despite the very small dimensions of this combustion chamber, where the gas transit time is measured in milliseconds.

The small combustion chamber used in these tests greatly limited the ability of moving the injector along the combustor axis to determine the location at which injection of $NH_3$ or urea in the cooler downstream direction would reduce $NO_x$. However, in a larger gas combustor it is possible to insert an injector 9 of FIG. 1 at one point in the sidewall of the combustion chamber and attach the injector head to an axially placed liquid feed tube of different lengths until the location of the $NO_x$ reduction is determined. On the other hand, in the present 120 hp turbine combustor, the total length of the chamber is so small that an axial relocation of the injector head by only a few inches in the downstream direction could place the outlet in the region below zone 8 of FIG. 1 where gas temperatures are too low for $NO_x$ reduction.

b) High Flow Axial Injection Tests:

The high flow tests were conducted with the ⅛-GA-2 and ⅛-GA-3 nozzles. As noted above, the latter nozzle has a higher flow rate for the same pressure. Also, according to the manufacturer, Spraying System, the mean droplet size is 700 microns for the smaller nozzle and 1000 microns for the larger one. The larger droplets take longer to vaporize and, therefore, a higher flow rate is needed to achieve the same $NO_x$ reduction with the larger injector.

For example, the ⅛-GA-3 nozzle in injector 10 of FIG. 1 with the conical spray 101 facing upstream yielded a 65% reduction of $NO_x$ to 0.07 lb/MMBtu, or 19 ppm at 14% $O_2$. The ratio of water flow to fuel flow was 1.71. The CO concentration increased from the 270 ppm baseline without water injection to 2,000 ppm.

The same injector configuration and injection direction with the ⅛-GA-2 nozzle yielded a 60% reduction to 0.09 lb/MMBtu, or 19 ppm at 15.2% O2. However, the water flow to fuel flow rate was now only 1, and the CO level increased to 800 ppm. Clearly, the smaller droplet size produced by this injector was the key parameter that resulted in the improved performance.

The ⅛-GA-3 was rotated 1800 so that the spray faced downstream, as injector 9 with spray 109 in FIG. 1, and 0.1% $NH_3$ was added to the water to produce a $NH_3/NO_2$ mol ratio of 1 based on the baseline $NO_x$ of 0.21 lb/MMBtu. In this case, the $NO_x$ level increased to 0.37 lb/MMBtu, or 86 ppm at 14.8% O2. However, the CO increased only to 384 ppm versus the baseline of 270 ppm. This result is consistent with all the other tests that were performed with upstream and downstream axial droplet injection.

The same explanation given for downstream injection with $NH_3$ for the smaller injectors apply here, namely, either the gas temperature at the injection point is too high, and/or re-circulation transports the injected $NH_3$ to the hotter zones 61 or even 7 in FIG. 1.

One test to validate this hypothesis in the 120 hp gas turbine would be to use two injectors, one facing upstream and injecting only water droplets, and the other, facing downstream, injecting $NO_3$ or urea, but at a much lower flow rate. In this way, $NO_x$ reductions as high as 85% should be achievable with 70% from the upstream directed water droplets, and an additional 50% reduction from downstream directed aqueous $NH_3$ or urea injection. For the 120 hp turbine, the results shown in FIG. 3 for water droplet injection, and assuming the same additional 50% urea or $NH_3$ reduction achieved in the prior art on boilers, would bring the $NO_x$ emissions down to 0.03 lb/MMBtu, or 7.5 ppm at 15% $O_2$, from 0.21 lb/MMBtu, or 41 ppm at 15% $O_2$. In view of the limited space in the 120 hp combustor, this dual injection test could be implemented with ⅛-GA-2 injector nozzle facing upstream at the zone 7 and 8 interface, 10 in FIG. 1, and injecting water only at 23 gph, the same as the fuel flow. The downstream facing injector 9 in FIG. 1 would consist of a ⅛ or 1/16 inch outside diameter tube inserted though the combustor sidewall at the same axial location as the water only injector and facing downstream. However instead of using an aqueous solution of, for example, 29% $NH_3$, this solution would be diluted down to about 20% in soluble methanol or isopropyl alcohol and injected at flow rates of only several gph. Since this mixture is combustible, the $NO_x$ reducing reagent would most probably remain near the injection zone where the reducing reaction is favored.

Figure 3:
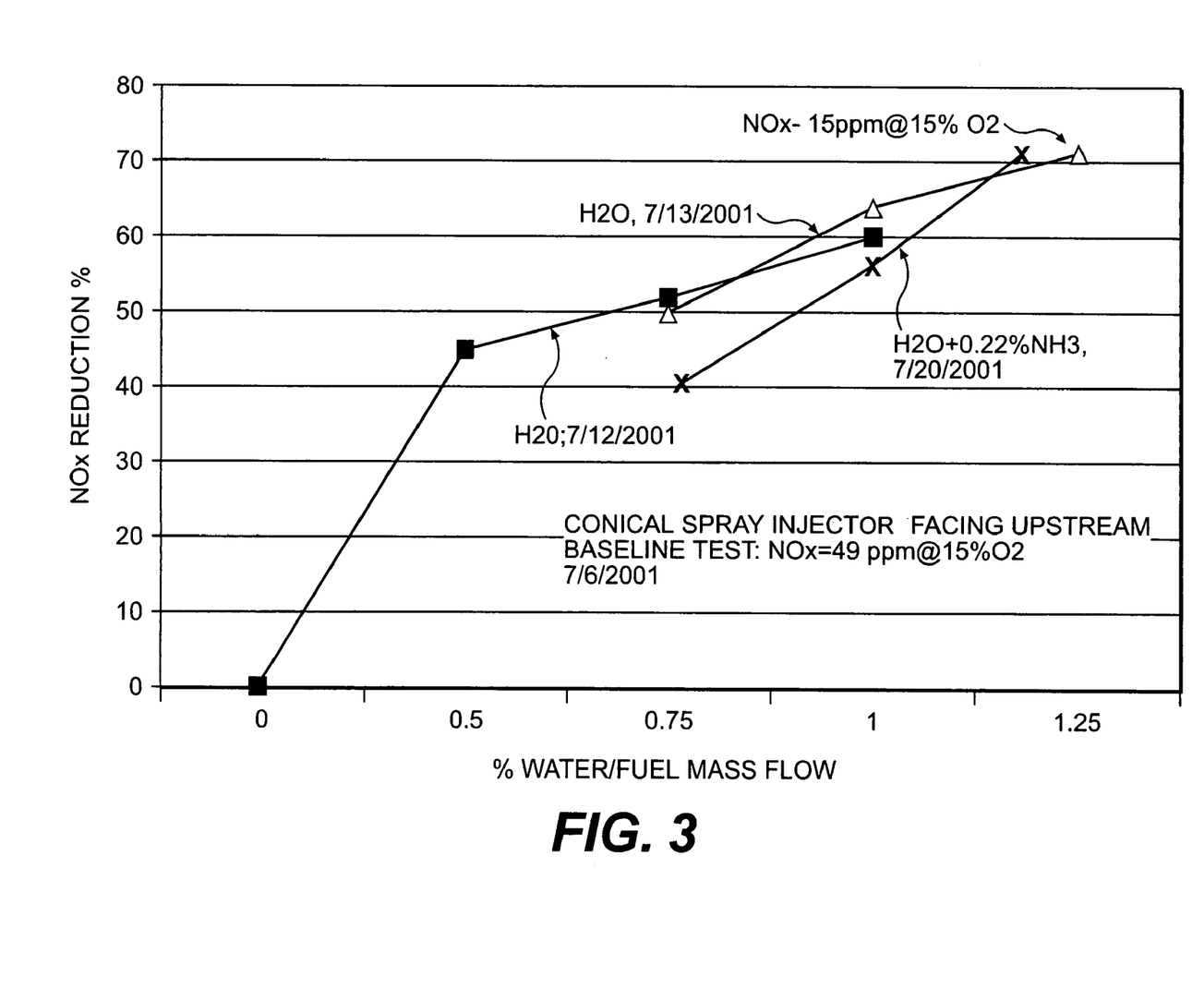
FIG. 3 shows NOx reduction test results obtained with a water droplet injector in a small gas turbine as a function of the liquid fuel to the water flow ratio.

FIG. 3 shows the results obtained with the ⅛-GA-2 nozzle. It was inserted as injector 10 with a spray 101 facing upstream. Tests were with water injection, and with water and 0.22% $NH_3$ which yielded a baseline $NH_3/NO_2$ mol ratio of unity. The abscissa is the water injection flow/fuel flow ratio. The $NO_x$ reduction with the addition of $NH_3$ is less at the lower water flow rates, but at the same flow rate ratio of 1.25, there is no difference between water only and water and NH$_3$. The peak NO$_x$ reduction measured was 71% to 0.06 lb/MMBtu, or 15 ppm at 15% O$_2$. The CO was 926 ppm.

One key point requires clarification, namely, the large NO$_x$ reductions obtained with water droplet injection in the upstream direction. Intuitively this should not occur because the gas flow drags the droplets downstream. However, the time needed for a droplet injected opposed to the gas velocity to lose its momentum due to the gas drag force is proportional to the droplet diameter. Ignoring the evaporation loss, a 700-micron droplet emanating from the ⅛-GA-2 nozzle at 24 gph and a 50 psi differential injection-combustor gas pressure loses its momentum in the upstream direction in a time that is much greater than the gas transit time between the injection point and the upstream end of combustion chamber. Therefore, even with the droplet evaporation loss, the large droplets will penetrate deep into the upstream direction of zone 7 in FIG. 1 and cool the gas temperature sufficiently to reduce thermal NO$_x$. On the other hand, at lower differential injection pressure, or with much smaller droplets, the depth of penetration of the droplets in the upstream direction would be much less. In that case, the injectors 10 should be moved to the zone 61-zone 7 interface and the conical spray 101 should be downstream direction, or, alternatively, the conical or flat spray injectors 13 should be moved toward the edge of zone 7 at its upstream end.

One final result of great importance is shown in Table 1. Here the NO$_x$ reduction with water droplet injection using the 1-8-GA-2 nozzle in injector 10 facing upstream is compared for three fuels, 87 Octane gasoline, kerosene, and No. 2 fuel oil.

TABLE 1

NO$_x$ Reduction with Water Injection in the 120 hp Gas Turbine versus Fuel Used.

| Fuel | H$_2$O/Fuel Ratio | % NO$_x$ Reduction | CO output, ppm |
|---|---|---|---|
| Gasoline, 87 Octane | 0.83 | 57 | 558 |
| Kerosene | 0.83 | 48 | 435 |
| Kerosene | 1.0 | 56 | 376 |
| No. 2 Oil | 1 | 46 | 443 |

Globally these results agree with Lefebvre's result (Lefebvre FIG. 5.9, page 169) that the time for evaporation controlled combustion of 60-micron particles at 2300° K decreases from gasoline to kerosene to diesel oil (same as No. 2 oil). This is obvious since the fuel's volatility decreases from gasoline to kerosene to diesel. The present results confirm that the greater the volatility the less water is needed to effect a specific NO$_x$ reduction. However, a much more important result was that the CO concentration for kerosene was far less in these comparison tests than in prior tests with kerosene before the gasoline test. For example, in a previous test with kerosene in which 56% NO$_x$ reduction was measured, the CO concentration increased to 800 ppm, more than twice the level in Table 1. The most probable explanation is that the detergent content in the gasoline cleaned the hydraulic fuel nozzle, which had not been cleaned during the entire prior test effort, with the result that the droplet spray pattern was improved and the droplet size was reduced. This is a very important result in that it suggests regular cleaning of the fuel injector should be implemented with a detergent additive.

In conclusion, the present test effort, in which four-dozen tests were implemented in a period of 2 months, demonstrated that the present invention's step for NO$_x$ reduction with water droplet injection is very effective, yielding up to 71% NO$_x$ reduction, without excessive CO increase over its baseline concentration.

The present tests did not validate the NO$_x$ reduction step with NH$_3$ or urea. This step has reduced NO$_x$ by up to 50% in coal or oil fired boilers. Instead in the 120 hp turbine there was a substantial increase of NO$_x$ of over a factor of 3 in some tests. However, the tests were severely restricted in terms of injector access by the very small size of the combustion chamber. Nevertheless, the present invention does disclose the type of injectors that should be used and how they should be inserted so as do distribute the NO$_x$ reducing reagent throughout the much larger combustion gas zone of large power turbines toward which this invention is primarily directed. Furthermore, a step is disclosed in which an upstream facing water droplet injector, followed by a smaller downstream facing injector fed with an aqueous NO$_x$ reducing reagent that is dissolved in isopropyl alcohol or methane can be used to effect the dual NO$_x$ reduction step in small gas turbines.

The third NO$_x$ reduction step of this invention, namely, improving the fuel injection process was also partially proven in that the CO concentration, which generally increases with decreasing NO$_x$ concentrations from water droplet injection, decreased sharply when the fuel nozzle was cleaned during combustion with a detergent gasoline.

Finally, and very importantly, the present invention shows that old presumably obsolete and obsolescent equipment, as the present over 40 year old, 120 hp gas turbine that was used to partially reduce this invention to practice, can be retrofitted at minimal cost to meet environmental standards in most of the U.S. of less than 0.1 lb/MMBtu. With all three NO$_x$ reduction steps implemented, the emissions may even approach the ultra-low NO$_x$ levels of 0.01 lb/MMBtu required in California.

I claim:

1. A process for reducing a concentration of nitrogen oxides, NO$_x$, in an effluent gas stream from a combustion of liquid or gaseous carbonaceous fuel in a gas turbine combustion chamber, comprising the steps of:

identifying a gas combustion temperature zone within said combustion chamber that is downstream of a zone of initial gasification of said liquid fuel and initial combustion of said liquid or gaseous carbonaceous fuel and where in an absence of any steps to cool a downstream gas temperature zone, approximately above 2500° F., thermal NO$_x$ production is provided;

injecting water droplets of varying size between 10 μm to 1000 μm by means of one or more nozzles that form a flat, planar, fan shaped, spray pattern which is oriented perpendicular to said effluent gas stream and is of cross-sectional area to intercept all of the effluent gas stream in said gas combustion temperature zone, and whose mean and maximum size of said droplets depend on the dimensions of said gas combustion temperature zone in said chamber;

varying hydraulic or air atomizing pressure in at least one injector in order to permit distribution and vaporization of different sized droplets at different locations within said gas combustion temperature zone, taking place during said injecting step; and adjusting a position of an injector droplet outlet of said at least one injector within said combustion chamber based on an outer edge of said gas combustion temperature zone identified in said identifying step, said adjusting step positioning said injector droplet outlet adjacent to said outer edge of said gas combustion temperature zone identified in said identifying step, with evaporation of said flat, planar, fan-shaped, spray pattern cooling said gas combustion temperature zone within said combustion chamber to temperatures, approximately below 2500° F., where thermal $NO_x$ production is suppressed.

2. A process in accordance with claim 1, where each injector has an atomizing air chamber with outlets for said droplets and inlets for liquid and air and each of said injectors are connected to a pipe that contains pressurized water, and a parallel compressed air pipe, where said air pipe and liquid filled pipe are each placed inside and co-axially within a pipe containing water flowing at sufficient rates to prevent boiling of said water in the pipes and inside droplets injector head which is placed in contact with the said hot gas temperatures, said outer water cooling flow pipes terminate a distance upstream of said compressed air and solution filled pipes, thereby allowing the cooling water to exit the outer cooling pipes and cool a rear of the injector head by evaporative cooling, with a balance of the outer cooling water flow entering the combustion chamber being treated and evaporating.

3. A process in accordance with claim 2, where one or more air atomized droplet injectors are used to produce very fine droplets, less than 100 microns in diameter, for the injection of the liquid fuel into the combustion zone immediately downstream of said injector, said combustion zone being immediately upstream of the combustion gas zone, with said fuel droplet size being selected so as to maximize a rate at which said droplets are vaporized and react with combustion air to reach temperatures of about 3000° F., thereby minimizing unburned hydrocarbons and carbon monoxide formation both in said 3000° F. zone and in an immediately downstream combustion zone and reducing thermal $NO_x$ formation by minimizing the gas residence time in said 3000° F. zone.

4. A process in accordance with claim 1, where said gas combustion temperature zone is determined by means of a thermocouple with either a bare exposed tip inserted into said effluent gas stream being treated, or with said thermocouple tip being recessed within a ceramic tube where said ceramic tube is held in place in a hollow metal pipe, which is connected to a vacuum source which draws the combustion gas into the ceramic tube and around the thermocouple tip.

5. A process in accordance with claim 4, wherein the metal pipe encloses thermocouple wires, and is surrounded by a water cooled, metal annular jacket in which cold inlet water flows through the outer annulus, turns 180° in an end cap, and returns through an inner annulus, where the tube wall of said inner annulus being the tube that contains said thermocouple wires.

6. A process in accordance with claim 1, where injector feed pipes to said at least one injector are each cooled by an external, coaxial jacket pipe having flowing water, at a rate controlled by flow meters, pressure gauges and valves.

7. A process in accordance with claim 1, further comprising the step of inserting said at least one injector either through pre-existing ports or by installing new access ports into said gas turbine combustion chamber.

8. A process in accordance with claim 1, wherein the one or more nozzles comprise hydraulic injectors whose flow capacity and droplet size distribution depends on the size of the combustion gas temperature zone.

9. A process in accordance with claim 1, comprising maximizing the combined $NO_x$ emission reduction and minimizing the CO and unburned hydrocarbon emissions.

10. A process for reducing the concentration of nitrogen oxides, $NO_x$, in an effluent gas stream from combustion of liquid or gaseous carbonaceous fuel in a gas turbine combustion chamber comprising the steps of:
    identifying a gas combustion temperature zone within said combustion chamber that is downstream of a zone of initial gasification of said liquid fuel and initial combustion of said liquid or gaseous carbonaceous fuel and where in absence of any steps to cool downstream gas in said gas combustion temperature zone, approximately above 2500° F., thermal $NO_x$ production is favored;
    injecting water droplets of varying size between 10 μm to 1000 μm by means of one or more nozzles that form a conical spray pattern which is opposed in a case of larger mean droplet size or in a direction in the case of smaller mean droplet size to an average velocity vector of said effluent gas stream and is of cross-sectional area to intercept all of the effluent gas stream in said gas combustion temperature zone, and whose mean and maximum size of said droplets depend on the dimensions of said gas combustion temperature zone in said combustion chamber;
    varying hydraulic or air atomizing pressure in an injector in order to permit distribution and vaporization of different sized droplets at different locations within said gas combustion temperature zone, taking place during said injecting step; and
    adjusting a position of an injector droplet outlet of said injector within said combustion chamber based on an outer edge of said gas combustion temperature zone identified in said identifying step, said adjusting step positioning said injector droplet outlet adjacent to said outer edge of said gas combustion temperature zone identified in said identifying step, with evaporation of said conical spray pattern cooling said gas combustion temperature zone within chamber to temperatures, approximately below 2500° F., where thermal $NO_x$ production is suppressed.

11. A process for reducing the concentration of nitrogen oxides, $NO_x$, in an effluent gas stream from combustion of liquid or gaseous carbonaceous fuel in a gas turbine combustion chamber comprising the steps of:
    identifying a gas combustion temperature zone within said combustion chamber whose gas temperature is between 1700° F. and 2200° F. and that is immediately downstream of the gas combustion temperature zone of initial gasification of said liquid fuel and initial combustion of said liquid or gaseous carbonaceous fuel;
    injecting water droplets, containing an aqueous solution of a $NO_x$ reducing agent, including one of ammonia and urea, of varying size between 10 μm to 1000 μm by means of one or more nozzles that form a flat, planar, fan shaped spray pattern which is oriented perpendicular to said effluent gas stream and is of sufficient cross-sectional area to intercept all of the effluent gas stream in a downstream combustion temperature zone, and whose mean and maximum size of said droplets depend on the dimensions of said downstream gas temperature zone in said combustion chamber;
    varying hydraulic or air atomizing pressure in an injector in order to permit distribution and vaporization of different sized droplets at different locations within said gas combustion temperature zone, taking place during said injecting step; and adjusting a position of an injector droplet outlet of said injector within said combustion chamber based on an outer edge of said downstream combustion temperature zone identified in said identifying step, said adjusting step positioning said injector droplet outlet adjacent to said outer edge of said gas combustion temperature zone identified in said identifying step, with subsequent to evaporation of said droplets in said downstream combustion gas temperature zone, said $NO_x$ reducing reagent reacting with the $NO_x$ molecules and converting them to $N_2$.

12. A process in accordance with claim 11, wherein the $NO_x$ reducing reagents, are dissolved and mixed with water, and further mixed with liquids including one of isopropyl alcohol and methanol that bind with water molecules, and said solution being injected in a zone where gas temperatures favor the $NO_x$ reducing reactions between approximately 1700 ° F. and 2200° F.

13. A step in accordance with claim 12, wherein additional fuel is mixed with $NO_x$ reducing agents reacts and the combined liquid is injected at an upstream end of the downstream combustion temperature zone and into a reburn combustion zone to effect a conversion of fuel lean gas to fuel rich gas, with said reburn combustion zone being heated by several hundred degrees Fahrenheit above a 2200° F. ceiling when the $NO_x$ reducing reagent is injected into a fuel lean zone.

14. A process in accordance with claim 11, wherein additional fuel is injected at an upstream end of the downstream combustion temperature zone in order to convert said downstream combustion temperature zone to slightly fuel rich conditions, to reduce $NO_x$.

15. A process in accordance with claim 14, wherein the $NO_x$ reducing reagents are injected slightly downstream of the reburn fuel at a location where the local gas conditions are fuel rich.

16. A step in accordance with claim 14, wherein final combustion air is introduced immediately downstream of said fuel rich reburn zone to effect final combustion.

17. A process in accordance with claim 14, wherein passages for entry of compressed air into a primary and immediate post primary combustion zones are limited to maintain local gas conditions slightly fuel lean, approximately 8% to no more than 20%.

18. A process for reducing the concentration of nitrogen oxides, $NO_x$, in an effluent gas stream from the combustion of liquid or gaseous carbonaceous fuel in a gas turbine combustion chamber comprising the steps of:

identifying a gas combustion temperature zone within said combustion chamber whose gas temperature is between 1700° F. and 2200° F. and that is immediately downstream of a gas combustion temperature zone of initial gasification of said liquid fuel and initial combustion of said liquid or gaseous carbonaceous fuel;

injecting water droplets, containing an aqueous solution of a $NO_x$ reducing agent, including one of ammonia and urea, of varying size, between 10 μm to 1000 μm by means of one or more nozzles that form a conical spray pattern which is either opposed in a case of larger mean droplet size or in a direction in a case of smaller mean droplet size to the average velocity vector of said effluent gas stream and is of sufficient cross-sectional area to intercept all of the effluent gas stream in said downstream gas combustion temperature zone, and whose mean and maximum size of said droplets depend on the dimensions of said gas temperature zone in said chamber;

a producing step taking place during said injecting step by varying hydraulic or air atomizing pressure in an injector in order to permit distribution and vaporization of different sized droplets at different locations within said gas combustion temperature zone; and adjusting a position of an injector droplet outlet of an injector within said combustion chamber based on an outer edge of said gas combustion temperature zone identified in said identifying step, said adjusting step positioning said injector droplet outlet adjacent to said outer edge of said downstream gas temperature zone identified in said identifying step, with subsequent to evaporation of said droplets in said downstream combustion gas temperature zone, said $NO_x$ reducing reagent reacting with the $NO_x$ molecules and converting them to $N_2$.

19. A process in accordance with claim 18, wherein the $NO_x$ reducing reagents are dissolved and mixed with water, and further mixed with liquids including one of isopropyl alcohol and methanol that bind with water molecules, and a final solution being mixed with the liquid gas fuel, and injected in regions away from bulk of the liquid or gaseous gas carbonaceous fuel and a hottest part of the gas combustion chamber in order for the $NO_x$ reducing agent, to react with and reduce the $NO_x$.

20. A process in accordance with claim 18, wherein the $NO_x$ reducing reagents, are dissolved and mixed with water, and further mixed with liquids including one of isopropyl alcohol and methanol that bind with water molecules, and said solution being injected in a zone where gas temperatures favor the $NO_x$ reducing reactions between approximately 1700° F. and 2200° F.

21. A process in accordance with claim 18, wherein additional fuel is injected at an upstream end of the downstream combustion temperature zone in order to convert said downstream combustion temperature zone to slightly fuel rich conditions, to reduce $NO_x$.

* * * * *